United States Patent
Gong et al.

(10) Patent No.: US 12,038,681 B2
(45) Date of Patent: Jul. 16, 2024

(54) PROJECTION OPTICAL PATH AND PROJECTION DEVICE

(71) Applicant: GOERTEK OPTICAL TECHNOLOGY CO., LTD., Shandong (CN)

(72) Inventors: Jingjian Gong, Shandong (CN); Yangchun Deng, Shandong (CN); Weitao Ding, Shandong (CN); Dean Liu, Shandong (CN); Gongtao Lu, Shandong (CN)

(73) Assignee: GOERTEK OPTICAL TECHNOLOGY CO., LTD, Weifang (CN)

( * ) Notice: Subject to any disclaimer, the term of this patent is extended or adjusted under 35 U.S.C. 154(b) by 0 days.

(21) Appl. No.: 18/036,794

(22) PCT Filed: Jun. 21, 2021

(86) PCT No.: PCT/CN2021/101209
§ 371 (c)(1),
(2) Date: May 12, 2023

(87) PCT Pub. No.: WO2022/100097
PCT Pub. Date: May 19, 2022

(65) Prior Publication Data
US 2023/0408898 A1   Dec. 21, 2023

(30) Foreign Application Priority Data
Nov. 13, 2020   (CN) .......................... 202022637807.X (51) Int. Cl.
*G03B 21/28*   (2006.01)
(52) U.S. Cl.
CPC .................................. *G03B 21/28* (2013.01)

(58) Field of Classification Search
CPC .......................... F21Y 2113/10; F21Y 2113/13
See application file for complete search history.

(56) References Cited

U.S. PATENT DOCUMENTS 10,754,236 B2 *   8/2020   Chang ..................... F21V 13/14
11,586,101 B2 *   2/2023   Pettitt ........................ G02B 5/26

FOREIGN PATENT DOCUMENTS

| CN | 105474073 A | 4/2016 |
| CN | 108415212 A | 8/2018 |

(Continued)

OTHER PUBLICATIONS

International Search Report from International Application No. PCT/CN2021/101209 mailed Sep. 22, 2021.

*Primary Examiner* — Robert J May
(74) *Attorney, Agent, or Firm* — Shih IP Law Group, PLLC (57) ABSTRACT

Disclosed are a projection optical path and a projection device. The projection optical path includes a first converged light of a first dual-light source system and a second converged light of a second dual-light source system; a first wavelength light, a second wavelength light, and a third wavelength light are respectively one of red light, green light, and blue light; a fourth wavelength light is within a wavelength range of the red light; the wavelength of the fourth wavelength light is defined as $\lambda 1$; the wavelength of the one set as the red light among the first wavelength light, the second wavelength light, and the third wavelength light is $\lambda 2$; $\lambda 1$ is unequal to $\lambda 2$; an excitation light source emits an excitation light; and the excitation light is emitted to the first dual-light source system or the second dual-light source system.

6 Claims, 4 Drawing Sheets

(56) References Cited

FOREIGN PATENT DOCUMENTS

| | | |
|---|---|---|
| CN | 207992666 U | 10/2018 |
| CN | 111458891 A | 7/2020 |
| CN | 211289937 U | 8/2020 |
| CN | 112305845 A | 2/2021 |
| CN | 113031292 A | 6/2021 |
| CN | 213457629 U | 6/2021 |
| JP | 2010286521 A | 12/2010 |
| KR | 20170133936 A | 12/2017 |

\* cited by examiner

PROJECTION OPTICAL PATH AND PROJECTION DEVICE

This application claims the priority to and benefits of Chinese Patent Application No. 202022637807.X, titled "PROJECTION OPTICAL PATH AND PROJECTION DEVICE", filed on Nov. 13, 2020, which is incorporated by reference as if fully set forth herein.

TECHNICAL FIELD

The present disclosure relates to the technical field of optical display, particularly, to a projection optical path and a projection device.

BACKGROUND ART

In optical projection display, a combination of red, green and blue lights is used as a projection light source. In order to improve the brightness of the projection screen, it is necessary to increase the number of light rays of corresponding colors, that is, increase the luminous flux. A conventional method to increase the luminous flux is to increase the current of corresponding power supply, so that light sources corresponding to the three colors can generate more light rays. However, the red light source is relatively sensitive to temperature, and when the current increases to a certain level, the amount of red light increases, resulting in a thermal effect, which leads to a sudden drop in the luminous efficiency of the red light source. To this end, two kinds of red light sources are used, so as to reduce the thermal effect produced by the red light source. However, the luminous efficiency of light sources having other colors is still low, and it is difficult to effectively improve the overall brightness of the projection screen.

SUMMARY

In view of the above, in order to solve the problem that in the existing projection light source, when two kinds of red light sources are used to reduce the thermal effect produced by the red light source, the luminous efficiency of light sources having other colors is low and it is difficult to effectively improve the overall brightness of the projection screen, it is necessary to provide a projection optical path and a projection device capable of reducing the thermal effect generated by a red light source and improving the luminous efficiency of light sources having other colors, thereby effectively improving the brightness of a whole display screen.

In order to achieve the above object, the present disclosure provides a projection optical path including:

a first dual-light source system emitting a first converged light;

a second dual-light source system emitting a second converged light, wherein the first converged light and the second converged light are cross-converged, wherein the first dual-light source system includes a first light source and a second light source, the first light source emitting a first wavelength light, the second light source emitting a second wavelength light, and the first wavelength light and the second wavelength light being converged to form the first converged light; wherein the second dual-light source system includes a third light source and a fourth light source, the third light source emitting a third wavelength light, the fourth light source emitting a fourth wavelength light, the third wavelength light and the fourth wavelength light being converged to form the second converged light; wherein the first wavelength light, the second wavelength light and the third wavelength light are, respectively, one of red light, green light, or blue light; the fourth wavelength light is within a wavelength range of the red light; and wherein supposing that the wavelength of the fourth wavelength light is defined as $\lambda 1$ and the wavelength of the one set as the red light among the first wavelength light, the second wavelength light and the third wavelength light is $\lambda 2$, $\lambda 1$ is unequal to $\lambda 2$; and an excitation light source emitting an excitation light, wherein the excitation light is emitted to the first dual-light source system or the second dual-light source system.

Optionally, the excitation light is emitted to the first dual-light source system, the first dual-light source system includes a green light source, and the excitation light is emitted to the green light source.

Optionally, the projection optical path further includes a first beam splitter, the first beam splitter is disposed at a intersecting position of the first wavelength light and the second wavelength light, and the excitation light source is disposed at a side of the first beam splitter away from the second light source;

the first light source is a green light source, a surface of the first beam splitter facing the excitation light source is provided with a reflective film for the excitation light, and the excitation light is reflected towards the first light source through the first beam splitter;

alternatively, the second source is a green light source, a surface of the first beam splitter facing the excitation light source is provided with an anti-reflection film for the excitation light, and the excitation light is transmitted to the second light source.

Optionally, the projection optical path further includes a second beam splitter, the second beam splitter is disposed at an intersecting position of the first converged light and the second converged light, and the first converged light and the second converged light are converged and emitted through the second beam splitter.

Optionally, the projection optical path includes a first light emitting end surface, the first light emitting end surface is perpendicular to an exit direction of the first converged light; a surface of the second beam splitter facing the incident first converged light is provided with an anti-reflection film for the first wavelength light and the second wavelength light, and a surface of the second beam splitter facing the incident second converged light is provided with a reflective film for the third wavelength light and the fourth wavelength light; the first wavelength light and the second wavelength light are transmitted by the second beam splitter, and the third wavelength light and the fourth wavelength light are reflected by the second beam splitter; the first wavelength light, the second wavelength light, the third wavelength light and the fourth wavelength light are converged by the second beam splitter, and the converged light of the first wavelength light, the second wavelength light, the third wavelength light and the fourth wavelength light is emitted from the first light emitting end surface.

Optionally, the projection optical path includes a second light emitting end surface, the second light emitting end surface is parallel to the exit direction of the first converged light; a surface of the second beam splitter facing the incident first converged light is provided with a reflective film for the first wavelength light and the second wavelength light, and a surface of the second beam splitter facing the incident second converged light is provided with an anti-reflection film for the third wavelength light and the fourth wavelength light; the first wavelength light and the second wavelength light are reflected by the second beam splitter, and the third wavelength light and the fourth wavelength light are transmitted by the second beam splitter; the first wavelength light, the second wavelength light, the third wavelength light and the fourth wavelength light are converged by the second beam splitter, and the converged light of the first wavelength light, the second wavelength light, the third wavelength light and the fourth wavelength light is emitted from the second light emitting end surface.

Optionally, the projection optical path includes a first condenser lens and a second condenser lens, the first condenser lens is disposed in the exit direction of the first converged light, and the second condenser lens is disposed in an exit direction of the second converged light.

Optionally, the second light source and the third light source are disposed on an upper side of an exit optical path of the first wavelength light, and the excitation light source is disposed on a lower side of the exit optical path of the first wavelength light.

Optionally, the first wavelength light is a green light, the second wavelength light is a blue light, and the third wavelength light is a red light, a surface of the second beam splitter facing the first light source is provided with an anti-reflection film for the green light and the blue light, and a surface of the second beam splitter facing the third light source is provided with a reflective film for the red light.

Optionally, the excitation light source and the third light source are disposed on an upper side of an exit optical path of the first wavelength light, and the second light source is disposed on a lower side of the exit optical path of the first wavelength light.

In addition, in order to achieve the above object, the present disclosure further provides a projection device including a housing and the above-mentioned projection optical path, wherein the projection optical path is disposed in the housing.

According to the technical solution of the present disclosure, the first converged light emitted by the first dual-light source system and the second converged light emitted by the second dual-light source system are cross-converged. The first wavelength light, the second wavelength light, and the third wavelength light are, respectively, one of red light, green light, or blue light, and a combination of the three color lights is used as a light source of a projection screen. The fourth light source emits the fourth wavelength light, and the fourth wavelength light is converged together with the first wavelength light, the second wavelength light, and the third wavelength light. The fourth light source is also a red light. As such, when the fourth wavelength light is converged, the brightness of the projection screen is increased, and the red color of the projection light source is provided by two light sources, which reduces the thermal effect generated by a single red light source, and reduces a sudden drop in the luminous efficiency, so as to ensure that the projection light source can work stably.

In addition, the red wavelength of the fourth wavelength light is different from the wavelength of red light in the first light source, the second light source or the third light source. Accordingly, the projection optical path can be divided into multiple paths for transmission, reducing the mutual interference between the fourth wavelength light of the fourth light source and the red light in the other three light sources, and ensuring that lights are converged at the same position and then emitted.

Further, the excitation light emitted by the excitation light source can improve the luminous efficiency of the first dual-light source system or the second dual-light source system, thereby increasing the number of emitted light rays and thus improving the brightness of the projection screen. Further, the first dual-light source system and the second dual-light source system can be installed independently, thereby saving installation steps.

BRIEF DESCRIPTION OF THE DRAWINGS

In order to explain the technical solutions of the embodiments of the present disclosure or in the prior art more clearly, the following will briefly illustrate the accompanying drawings required for the description of the embodiments or the prior art. Obviously, the drawings in the following description are only part of the drawings of the present disclosure, and for those skilled in the art, other drawings can also be obtained according to the provided drawings without any creative effort.

EXPLANATION OF REFERENCE NUMERALS

| Reference Numeral | Name |
|---|---|
| 1 | first dual-light source system |
| 2 | second dual-light source system |
| 10 | first light source |
| 20 | second light source |
| 30 | third light source |
| 40 | fourth light source |
| 50 | excitation light source |
| 60 | collimating lens group |
| 610 | first collimating lens |
| 620 | second collimating lens |
| 710 | first beam splitter |
| 720 | second beam splitter |
| 730 | third beam splitter |
| 810 | first condenser lens |
| 820 | second condenser lens |
| 910 | first light emitting end surface |
| 920 | second light emitting end surface |

The implementation, functional features and advantages of the present disclosure will be further described with reference to accompanying drawings in conjunction with the embodiments.

DETAILED DESCRIPTION OF THE EMBODIMENTS

The technical solutions of the embodiments of the present disclosure will be described below with reference to the drawings. Obviously, the described embodiments are only part of the embodiments of the present disclosure, rather than all the embodiments. Based on the embodiments according to the present disclosure, all other embodiments obtained by persons of ordinary skill in the art without creative efforts shall fall within the protection scope of the present disclosure.

In optical projection display, a combination of red, green and blue lights is used as a projection light source. In order to improve the brightness of the projection screen, the current of corresponding power supply is generally increased, so that light sources corresponding to the three colors can generate more light rays. However, the red light source is relatively sensitive to temperature, and when the current increases to a certain level, the amount of red light increases, resulting in a thermal effect. To this end, two kinds of red light sources are used, so as to reduce the thermal effect produced by the red light source. However, the luminous efficiency of light sources having other colors is still low, and it is difficult to effectively improve the overall brightness of the projection screen.

Figure 1A:
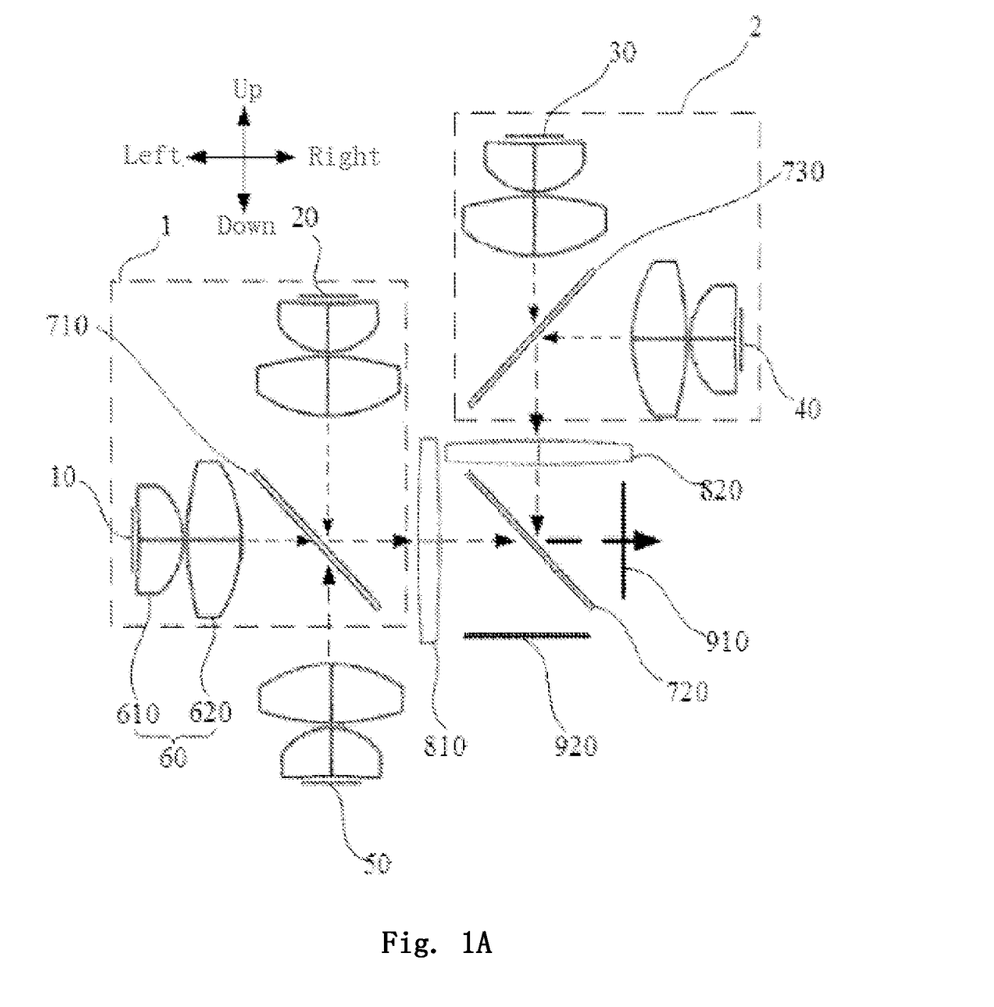
FIGS. 1A-1B are structural schematic diagrams of a projection optical path according to a first embodiment of the present disclosure.

In order to solve the above problems, referring to FIG. 1A, the present disclosure provides a projection optical path, which includes a first dual-light source system 1 and a second dual-light source system 2. The first dual-light source system 1 and the second dual-light source system 2 are independent light source components and can be installed separately. The first dual-light source system 1 emits a first converged light, the second dual-light source system 2 emits a second converged light, and the first converged light and the second converged light are cross-converged.

The first dual-light source system 1 includes a first light source 10 and a second light source 20, the first light source 10 emits a first wavelength light, the second light source 20 emits a second wavelength light, and the first wavelength light and the second wavelength light are converged to form the first converged light; the second dual-light source system 2 includes a third light source 30 and a fourth light source 40, the third light source 30 emits a third wavelength light, the fourth light source 40 emits a fourth wavelength light, and the third wavelength light and the fourth wavelength light are converged to form the second converged light; the first wavelength light, the second wavelength light and the third wavelength light are, respectively, one of red light, green light, or blue light. That is, when the first wavelength light is a green light, the second wavelength light may be a red light, and the third wavelength light may be a blue light; or, when the first wavelength light is a green light, the second wavelength light may be a blue light, and the third wavelength light may be a blue light. Alternatively, when the first wavelength light is a red light, the second wavelength light may be a green light, and the third wavelength light may be a blue light; or, when the first wavelength light is a red light, the second wavelength light may be a blue light, and the third wavelength light may be a green light. Alternatively, when the first wavelength light is a blue light, the second wavelength light may be a green light, and the third wavelength light may be a red light; or, when the first wavelength light is a blue light, the second wavelength light may be a red light, and the third wavelength light may be a green light. The colors of the first wavelength light, the second wavelength light and the third wavelength light are selected among red light, green light and blue light, and the colors of the three wavelength lights are different from each other. The fourth wavelength light is within a wavelength range of the red light; supposing that the wavelength of the fourth wavelength light is defined as $\lambda 1$ and the wavelength of the one set as the red light among the first wavelength light, the second wavelength light and the third wavelength light is $\lambda 2$, $\lambda 1$ is unequal to $\lambda 2$. As an example, the wavelength of red light is in a range between 600 nm and 740 nm, if the first wavelength light is a red light, and the wavelength $\lambda 2$ of the first wavelength light is 620 nm, the wavelength $\lambda 1$ of the fourth wavelength light is 650 nm. As another example, if the wavelength $\lambda 2$ of the first wavelength light is 625 nm, the wavelength $\lambda 1$ of the fourth wavelength light is 660 nm.

Here, the first light source 10, the second light source 20, the third light source and the fourth light source 40 may be light-emitting diodes (LEDs), laser diodes (LDs), or super luminescent diodes (SLDs).

An excitation light source 50 emits an excitation light, and the excitation light is emitted to the first dual-light source system 1 or the second dual-light source system 2. The excitation light source 50 is a pumping lamp. For example, the excitation light is a blue light, and the blue excitation light is emitted to the first dual-light source system 1 or the second dual-light source system 2, thereby increasing the fluorescent molecules of corresponding light source, and thus increasing the number of emitted light rays of corresponding light source.

In addition, it is known to those skilled in the art that the light emitted by any light source is a light beam with a certain wavelength range, so the first wavelength light in the present disclosure refers to a light beam with the first wavelength as a dominant wavelength, and the wavelength of the first wavelength light in the present disclosure refers to the dominant wavelength of the first wavelength light. Correspondingly, the same goes for the second wavelength light, the third wavelength light and the fourth wavelength light. Here, the dominant wavelength may also be understood as a central wavelength.

According to the technical solution of the present disclosure, the first converged light emitted by the first dual-light source system 1 and the second converged light emitted by the second dual-light source system 2 are cross-converged. The first wavelength light, the second wavelength light, and the third wavelength light are, respectively, one of red light, green light, or blue light, and a combination of the three color lights is used as a light source of a projection screen.

The fourth light source 40 emits the fourth wavelength light, and the fourth wavelength light is converged together with the first wavelength light, the second wavelength light, and the third wavelength light. The fourth light source is also a red light. As such, when the fourth wavelength light is converged, the brightness of the projection screen is increased, and the red color of the projection light source is provided by two light sources, which reduces the thermal effect generated by a single red light source, and reduces a sudden drop in the luminous efficiency, so as to ensure that the projection light source can work stably.

In addition, the red wavelength of the fourth wavelength light is different from the wavelength of red light in the first light source 10, the second light source 20 or the third light source 30. Accordingly, the projection optical path can be divided into multiple paths for transmission, reducing the mutual interference between the fourth wavelength light of the fourth light source 40 and the red light in the other three light sources, and ensuring that lights are converged at the same position and then emitted.

Further, the excitation light emitted by the excitation light source 50 can improve the luminous efficiency of the first dual-light source system 1 or the second dual-light source system 2, thereby increasing the number of emitted light rays and thus improving the brightness of the projection screen. Further, the first dual-light source system 1 and the second dual-light source system 2 can be installed independently, thereby saving installation steps.

In the above embodiment, the excitation light is emitted to the first dual-light source system 1, the first dual-light source system 1 includes a green light source, the first light source 10 is a green light, and the excitation light is emitted to the first light source 10; or, the second light source 20 is a green light, and the excitation light is emitted to the second light source 20. After the excitation light is emitted to the green light source, the fluorescent molecules of the green light source can be increased. It can be seen from this that the excitation light is emitted to the green light source.

In the above embodiment, in order to ensure that the excitation light can be accurately emitted to the first light source 10 or the second light source 20, the projection optical path further includes a first beam splitter 710, the first beam splitter 710 is disposed at a intersecting position of the first wavelength light and the second wavelength light, and the excitation light source 50 is disposed at a side of the first beam splitter 710 away from the second light source 20;

the first light source 10 is a green light source, a surface of the first beam splitter 710 facing the excitation light source 50 is provided with a reflective film for the excitation light, and the excitation light is reflected towards the first light source 10 through the first beam splitter 710; and the excitation light is a blue light, and the blue excitation light is reflected by the first beam splitter 710 and emitted to the first light source 10, which increases the fluorescent molecules of green light, thereby increasing the amount of green light.

Alternatively, the second source 20 is a green light source, a surface of the first beam splitter 710 facing the excitation light source 50 is provided with an anti-reflection film for the excitation light, and the excitation light is transmitted to the second light source 20. The blue excitation light is transmitted by the first beam splitter 710 and emitted to the second light source 20, which increases the fluorescent molecules of green light, thereby increasing the amount of green light.

In the above embodiment, in order to effectively converge the first converged light and the second converged light, the projection optical path further includes a second beam splitter 720, the second beam splitter 720 is disposed at an intersecting position of the first converged light and the second converged light, and the first converged light and the second converged light are converged and emitted through the second beam splitter 720. The transmission or reflection of the first converged light and the second converged light by the second beam splitter 720 ensures that the first converged light and the second converged light are emitted from the same light-emitting direction.

In the above embodiment, in order to effectively converge the third wavelength light and the fourth wavelength light, the second dual-light source system 2 further includes a third beam splitter 730, the optical paths of the third wavelength light and the fourth wavelength light intersect each other, and the third beam splitter 730 is disposed at a intersecting position of the third wavelength light and the fourth wavelength light. The third wavelength light and the fourth wavelength light are converged by the transmission or reflection of the third wavelength light and the fourth wavelength light through the third beam splitter 730.

Specifically, a surface of the third beam splitter 730 facing the third light source 30 is provided with an anti-reflection film for the third wavelength light, and a surface of the third beam splitter 730 facing the fourth light source 40 is provided with a reflective film for the fourth wavelength light. The anti-reflection film for the third wavelength light can increase the transmittance of the third wavelength light, and the reflective film for the fourth wavelength light can increase the reflectivity of the fourth wavelength light, so that the third wavelength light and the fourth wavelength light are emitted from the same surface of the third beam splitter 730, thereby converging the third wavelength light and the fourth wavelength light into the second converged light. Here, the anti-reflection film for the third wavelength light and the reflective film for the fourth wavelength light may be disposed on the same surface of the third beam splitter 730, or may be separately disposed on both surfaces of the third beam splitter 730.

In the above embodiment, the projection optical path includes a first light emitting end surface 910, and the first light emitting end surface 910 is perpendicular to an exit direction of the first converged light; a surface of the second beam splitter 720 facing the incident first converged light is provided with an anti-reflection film for the first wavelength light and the second wavelength light, and a surface of the second beam splitter 720 facing the incident second converged light is provided with a reflective film for the third wavelength light and the fourth wavelength light; the first wavelength light and the second wavelength light are transmitted by the second beam splitter 720, and the third wavelength light and the fourth wavelength light are reflected by the second beam splitter 720; and the first wavelength light, the second wavelength light, the third wavelength light and the fourth wavelength light are converged by the second beam splitter 720, and the converged light of the first wavelength light, the second wavelength light, the third wavelength light and the fourth wavelength light is emitted from the first light emitting end surface 910. Thereby, the first converged light and the second converged light are effectively converged. Here, the anti-reflection film for the first wavelength light and the second wavelength light and the reflective film for the third wavelength light and the fourth wavelength light may be disposed on the same surface of the second beam splitter 720, or may be separately disposed on both surfaces of the second beam splitter 720.

Figure 1B:
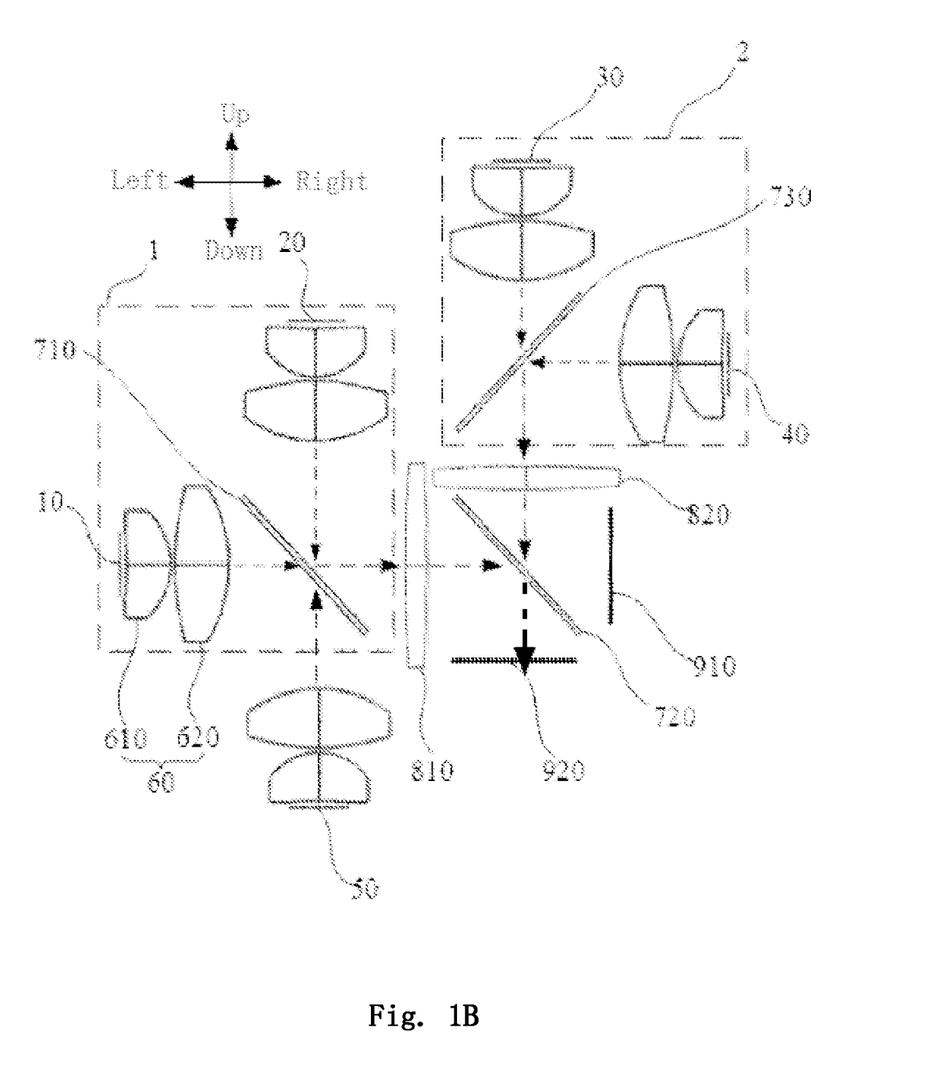
Figure 2A:
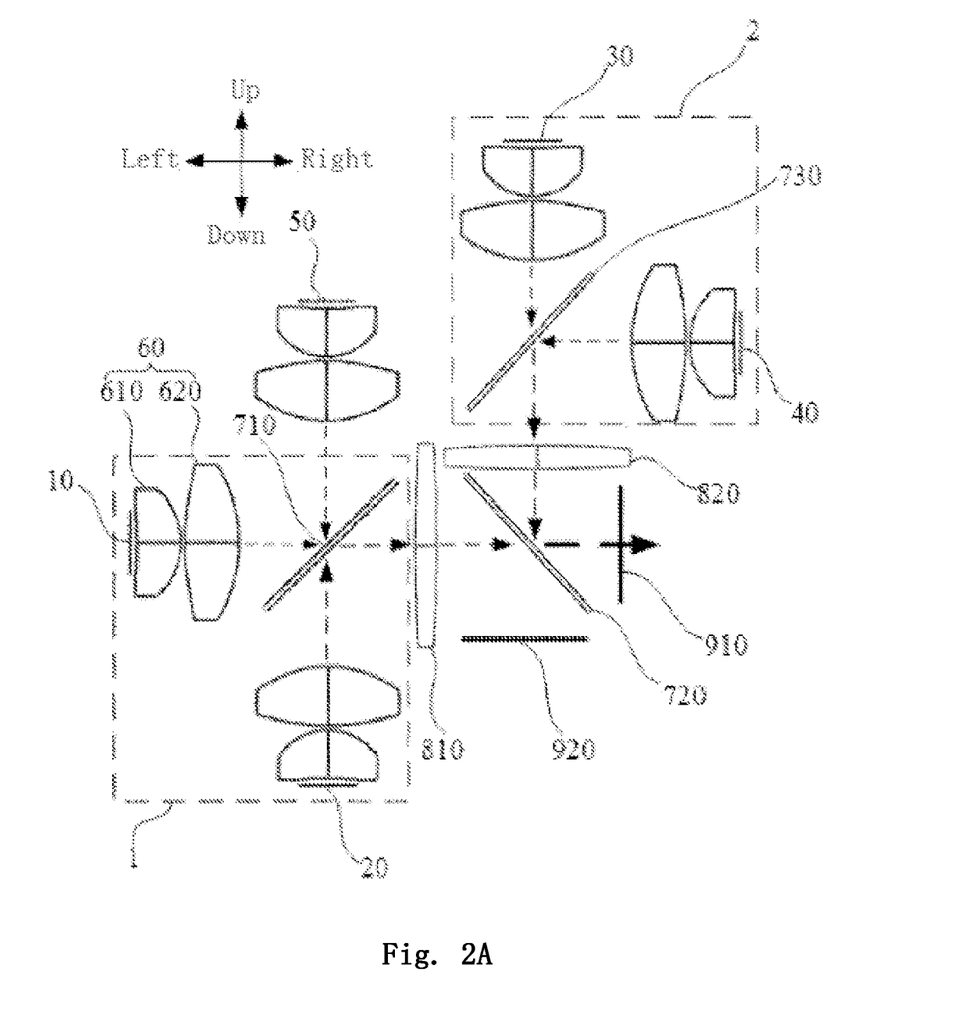
FIGS. 2A-2B are structural schematic diagrams of a projection optical path according to a second embodiment of the present disclosure.
Figure 2B:
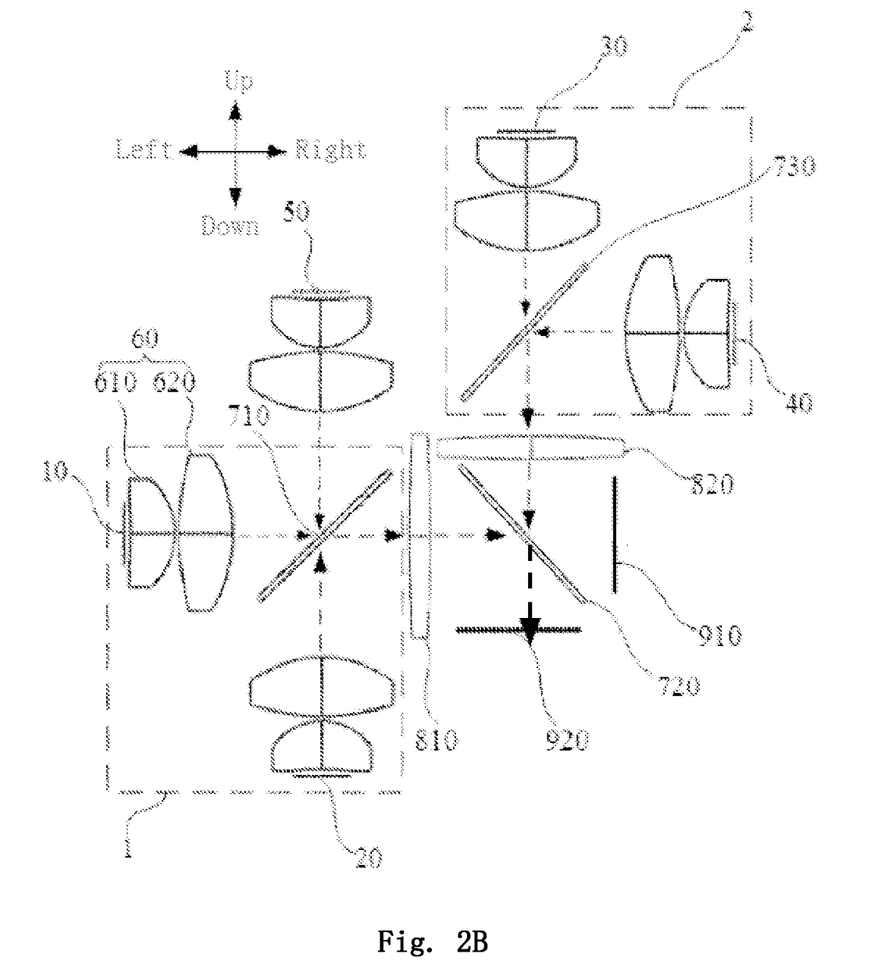

In addition, in another embodiment of the present disclosure, as illustrated in FIGS. 1B and 2B, the projection optical path includes a second light emitting end surface 920, and the second light emitting end surface 920 is parallel to the exit direction of the first converged light; a surface of the second beam splitter 720 facing the incident first converged light is provided with a reflective film for the first wavelength light and the second wavelength light, and a surface of the second beam splitter 720 facing the incident second converged light is provided with an anti-reflection film for the third wavelength light and the fourth wavelength light; the first wavelength light and the second wavelength light are reflected by the second beam splitter 720, and the third wavelength light and the fourth wavelength light are transmitted by the second beam splitter 720; and the first wavelength light, the second wavelength light, the third wavelength light and the fourth wavelength light are converged by the second beam splitter 720, and the converged light of the first wavelength light, the second wavelength light, the third wavelength light and the fourth wavelength light is emitted from the second light emitting end surface. Thereby, the first converged light and the second converged light are effectively converged. Here, the reflective film for the first wavelength light and the second wavelength light and the anti-reflection film for the third wavelength light and the fourth wavelength light may be disposed on the same surface of the second beam splitter 720, or may be separately disposed on both surfaces of the second beam splitter 720.

In order to reduce the divergence of light, the projection optical path includes a first condenser lens 810 and a second condenser lens 820, the first condenser lens 810 is disposed in the exit direction of the first converged light, and the second condenser 820 lens is disposed in an exit direction of the second converged light. The first wavelength light and the second wavelength light can be converged through the condensing effect of the first condenser lens 810, and the divergence of the first converged light can be reduced while first wavelength light and the second wavelength light are further mixed. Further, in order to reduce the divergence of light, the projection optical path includes the second condenser lens 820, the converged light of the third wavelength light and the fourth wavelength light is emitted to the second condenser lens 820, and the third wavelength light and the fourth wavelength light can be converged through the condensing effect of the second condenser lens 820, thereby reducing the divergence of the light.

Further, the projection optical path includes a number of collimating lens groups 60, which are at least disposed in the light-emitting direction of one of the first light source 10, the second light source 20, the third light source 30 or the fourth light source 40, and corresponding light rays can be directed to corresponding positions accurately through the collimating lens groups 60. For example, the collimating lens group 60 includes a first collimating lens 610 and a second collimating lens 620, the first collimating lens 610 is disposed facing the corresponding light source, the second collimating lens is disposed facing away from the corresponding light source, and the first collimating lens 610 and the second collimating lens 620 are any one of spherical lens, aspheric lens or free-form surface lens. The collimating lens group 60 may also include three collimating lenses, and the three collimating lenses may also be any one of spherical lens, aspheric lens or free-form surface lens.

Referring back to FIG. 1A, in order to flexibly adjust the installation position of the projection optical path according to the installation space, the second light source 20 and the third light source 30 are disposed on an upper side of an exit optical path of the first wavelength light, and the excitation light source 50 is disposed on a lower side of the exit optical path of the first wavelength light. At this time, the exit directions of the second light source 20 and the third light source 30 are in the same direction, the exit directions of the exciting light source 50 and the third light source 30 are opposite to each other, and the exit direction of the fourth light source 40 is perpendicular to the exit direction of the third light source 30.

For example, the first wavelength light is a green light, the second wavelength light is a blue light, and the third wavelength light is a red light; a surface of the second beam splitter 720 facing the first light source 10 is provided with an anti-reflection film for the green light and the blue light, and a surface of the second beam splitter 720 facing the third light source 30 is provided with an a reflective film for the red light. The wavelength ranges of green light and blue light are similar, and a higher pass rate can be obtained through the second beam splitter 720. Likewise, both the third wavelength light and the fourth wavelength light are red lights with different wavelengths and similar wavelength ranges, and a higher pass rate can be obtained through the second beam splitter 720. Thereby, the first dual-light source system 1 includes a green light source and a blue light source, and the second dual-light source system 2 includes two red light sources with different wavelengths, which can further increase the light output.

Referring to FIGS. 2A and 2B, the excitation light source 50 and the third light source 30 are disposed on an upper side of the exit optical path of the first wavelength light, and the second light source 20 is disposed on a lower side of the exit optical path of the first wavelength light. At this time, the exit directions of the second light source 20 and the third light source 30 are opposite to each other, the exit directions of the exciting light source 50 and the third light source 30 are in the same direction, and the exit direction of the fourth light source 40 is perpendicular to the exit direction of the third light source 30. In addition, the fourth light source 40 and the first light source 10 may be disposed on a left side of the exit optical path of the third wavelength light. Alternatively, the fourth light source 40 is disposed on a right side of the exit optical path of the third wavelength light, and the first light source 10 is disposed on a left side of the exit optical path of the third wavelength light.

The present disclosure also provides a projection device. The projection device includes a housing and the above-mentioned projection optical path, wherein the projection optical path is disposed in the housing. The housing has an installation space, the projection optical path is arranged in the installation space, and the housing can protect the projection optical path and reduce the probability of damage to optical components in the projection optical path. At the same time, the housing can also prevent dust from falling into the projection optical path, thereby reducing the influence of dust on the projection optical path. In addition, the housing can also be waterproof, reducing liquids such as rainwater or sweat from penetrating into the projection optical path, so as to prevent the liquid from corroding the optical components in the projection optical path.

The various embodiments in this specification are described in a parallel or progressive manner, and each embodiment focuses on the differences from other embodiments, and the same or similar parts between the various embodiments may be referred to each other. As for the device disclosed in the embodiment, since it corresponds to the method disclosed in the embodiment, the description is relatively simple. For relevant parts, reference may be made to the description of the method.

Those of ordinary skill in the art will understand that the units and algorithm steps of each example described in conjunction with the embodiments disclosed herein can be implemented by electronic hardware, computer software, or a combination thereof. In order to clearly explain the interchangeability of hardware and software, the composition and steps of each example have been generally described in the above description in terms of function. Whether these functions are performed in hardware or software depends on the specific application and design constraints of the embodiment. Those skilled in the art may implement the described functions for each specific application using different methods, but such implementations should not be considered beyond the scope of the present application.

The steps of the method or algorithm described in connection with the embodiments disclosed herein may be directly implemented by hardware, a software module executed by a processor, or a combination thereof. The software module may be disposed in a random access memory (RAM), an internal memory, a read only memory (ROM), an electrically programmable ROM, an electrically erasable programmable ROM, a register, a hard disk, a removable disk, a CD-ROM, or any other form of storage medium known in the art.

It should be noted that relational terms such as first and second described herein are only used to distinguish one entity or operation from another entity or operation, and do not necessarily require or imply any such actual relationship or order between these entities or operations. Moreover, terms such as "comprise", "include" or any other variation thereof are intended to encompass a non-exclusive inclusion such that a process, method, article or apparatus that includes a series of elements includes not only those elements, but also other elements not explicitly listed, or elements inherent to such a process, method, article or apparatus. Without further limitation, the element defined by the phrase "comprising a . . . " does not preclude the presence of additional identical elements in the process, method, article or apparatus including the element.

In addition, descriptions such as "first", "second", etc. in the present disclosure are only for descriptive purposes, and should not be construed as indicating or implying their relative importance or implicitly indicating the number of indicated technical features. Thus, features defined with "first" and "second" may explicitly or implicitly include at least one such feature. In the description of the present disclosure, "a plurality of" means at least two, such as two, three, etc., unless otherwise specifically defined.

In the present disclosure, unless otherwise expressly specified and limited, the terms "connected", "fixed", etc. should be understood in a broad sense. For example, "fixed" may refer to a fixed connection, a detachable connection, or may be integrated; may refer to a mechanical connection or an electrical connection; may be directly connected or indirectly connected through an intermediate medium; and it can be an internal communication between two elements or an interaction relationship between two elements, unless otherwise specified. For those of ordinary skill in the art, the specific meanings of the above terms in the present disclosure can be understood according to specific situations.

In addition, the technical solutions of various embodiments of the present disclosure can be combined with each other, but the combination must be based on the realization by those of ordinary skill in the art. When the combination of technical solutions is contradictory or impossible, it should be considered that the combination of such technical solutions does not exist, nor is it within the scope of protection claimed by the present disclosure.

What is claimed is:

1. A projection optical path comprising:
   a first dual-light source system emitting a first converged light;
   a second dual-light source system emitting a second converged light,
   wherein the first converged light and the second converged light are converged;
   wherein the first dual-light source system comprises a first light source and a second light source, the first light source emitting a first wavelength light, the second light source emitting a second wavelength light, and the first wavelength light and the second wavelength light being converged to form the first converged light;
   wherein the second dual-light source system comprises a third light source and a fourth light source, the third light source emitting a third wavelength light, the fourth light source emitting a fourth wavelength light, and the third wavelength light and the fourth wavelength light being converged to form the second converged light; and
   wherein the first wavelength light, the second wavelength light and the third wavelength light are, respectively, one of red light, green light or blue light and the fourth wavelength light is within a wavelength range of the red light; and supposing that the wavelength of the fourth wavelength light is defined as $\lambda 1$ and the wavelength of the one set as the red light among the first wavelength light, the second wavelength light and the third wavelength light is $\lambda 2$, $\lambda 1$ is unequal to $\lambda 2$; and
   an excitation light source emitting an excitation light, wherein the excitation light is emitted to the first dual-light source system or the second dual-light source system,
   wherein the excitation light is emitted to the first dual-light source system, the first dual-light source system comprises a green light source, and the excitation light is emitted to the green light source;
   wherein the projection optical path further comprises a first beam splitter, the first beam splitter being disposed at an intersecting position of the first wavelength light and the second wavelength light, and the excitation light source being disposed at a side of the first beam splitter away from the second light source;
   wherein the first light source comprises a green light source, a surface of the first beam splitter facing the excitation light source is provided with a reflective film for the excitation light, and the excitation light is reflected towards the first light source through the first beam splitter, or the second source comprises a green light source, a surface of the first beam splitter facing the excitation light source is provided with an anti-reflection film for the excitation light, and the excitation light is transmitted to the second light source;
   wherein the projection optical path further comprises a second beam splitter, the second beam splitter being disposed at an intersecting position of the first converged light and the second converged light and the first converged light and the second converged light being converged and emitted through the second beam splitter;
   wherein the projection optical path further comprises a first light emitting end surface, the first light emitting end surface being parallel to the exit direction of the first converged light;
   wherein a surface of the second beam splitter facing the incident first converged light is provided with a reflective film for the first wavelength light and the second wavelength light, and a surface of the second beam splitter facing the incident second converged light is provided with an anti-reflection film for the third wavelength light and the fourth wavelength light;
   wherein the first wavelength light and the second wavelength light are reflected by the second beam splitter, and the third wavelength light and the fourth wavelength light are transmitted by the second beam splitter; and
   wherein the first wavelength light, the second wavelength light, the third wavelength light and the fourth wavelength light are converged by the second beam splitter, and the converged light of the first wavelength light, the second wavelength light, the third wavelength light and the fourth wavelength light is emitted from the first light emitting end surface.

2. The projection optical path of claim 1, wherein the projection optical path comprises a first condenser lens and a second condenser lens, the first condenser lens being disposed in the exit direction of the first converged light, and the second condenser lens being disposed in an exit direction of the second converged light.

3. The projection optical path of claim 1, wherein the second light source and the third light source are disposed on an upper side of an exit optical path of the first wavelength light, and the excitation light source is disposed on a lower side of the exit optical path of the first wavelength light.

4. The projection optical path of claim 3, wherein the first wavelength light comprises a green light, the second wavelength light comprises a blue light, and the third wavelength light comprises a red light, a surface of the second beam splitter facing the first light source is provided with an anti-reflection film for the green light and the blue light, and a surface of the second beam splitter facing the third light source is provided with a reflective film for the red light.

5. The projection optical path of claim 1, wherein the excitation light source and the third light source are disposed on an upper side of an exit optical path of the first wavelength light, and the second light source is disposed on a lower side of the exit optical path of the first wavelength light.

6. A projection device, wherein the projection device comprises a housing and the projection optical path of claim 1, wherein the projection optical path is disposed in the housing.

* * * * *